(No Model.)
L. LEFLEVE.
CATTLE GUARD.
No. 513,946. Patented Jan. 30, 1894.
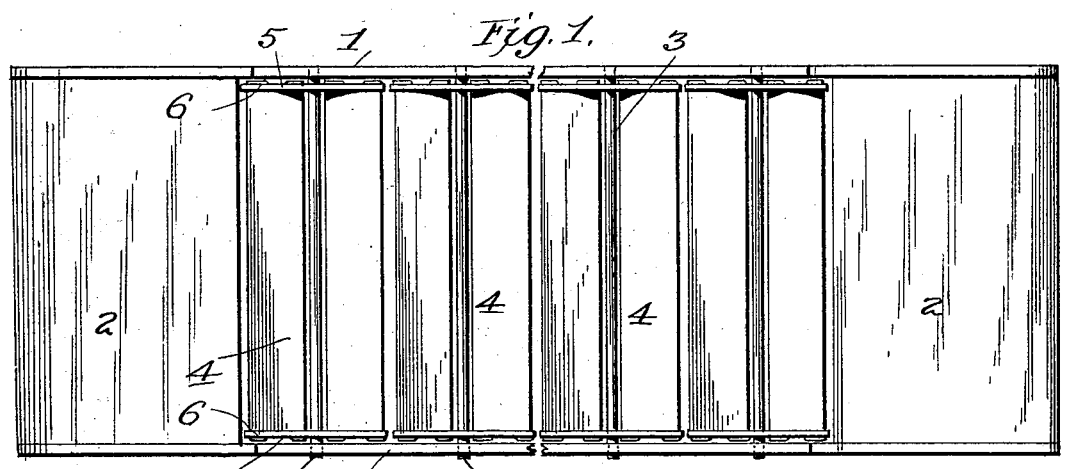
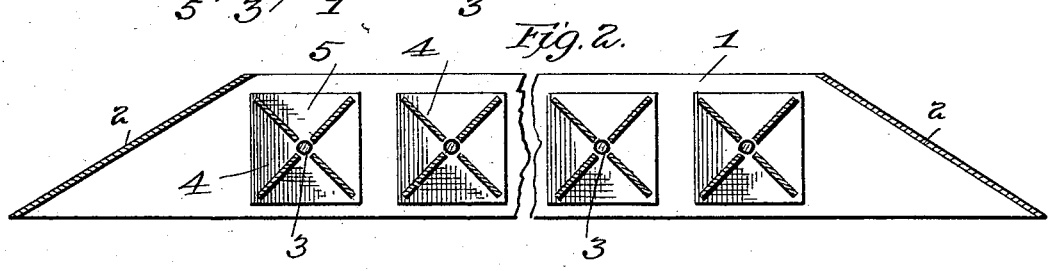
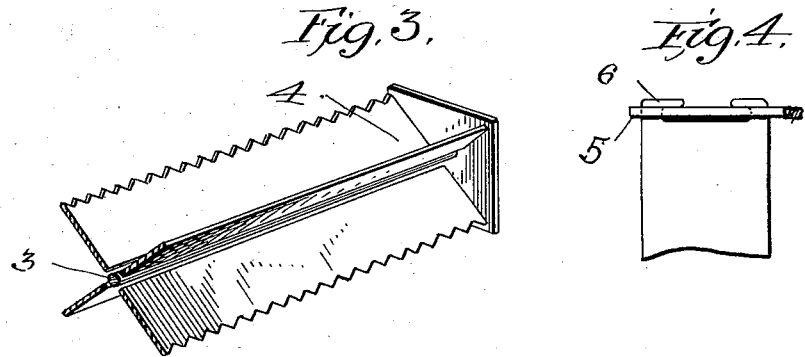
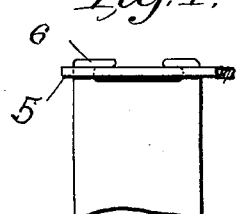
Attest
James McPhear
M. F. Altemus
Inventor
Louis Lefleve
by Walter Donaldson & Co.
Attys.

UNITED STATES PATENT OFFICE.

LOUIS LEFLÉVE, OF HOUSTON, TEXAS.

CATTLE-GUARD.

SPECIFICATION forming part of Letters Patent No. 513,946, dated January 30, 1894.

Application filed July 20, 1893. Serial No. 481,071. (No model.)

*To all whom it may concern:*

Be it known that I, LOUIS LEFLÉVE, a citizen of the Republic of France, formerly of St. Laurent, Department of Ain, France, now a resident of Houston, county of Harris, State of Texas, have invented certain new and useful Improvements in Cattle-Guards for the Use of Railroads and other Public Crossings; and I do hereby declare that the following is a full, clear, and exact description of the invention, which will enable others skilled in the art to which it appertains to use the same.

The object of my invention is to provide a simple and inexpensive form of cattle guard comprising rollers, wherein any roller may be removed and replaced readily and also the different bars composing each roller may likewise be removed.

My invention includes the details of construction and arrangement hereinafter pointed out.

In the drawings, Figure 1, is a plan view of the guard complete between the rails; Fig. 2, a longitudinal section, and Fig. 3, a perspective view of one of the removable rollers. Fig. 4 is a view of a detail.

The guard comprises a frame made up of side bars 1 with inclined ends between which extend the cross end plates 2 inclined to correspond with the inclined ends. The side bars have bearing openings through which pass the bearing rods 3. Removably on these the rollers 4 turn and any one of these rollers may be removed by taking out the bearing rod. These rollers are of novel construction and consist of four bars radiating from a central point but having their inner edges at a slight distance apart to leave an open center, and through this open center the bearing rod is free to pass. The bars are connected with the head plates 5 by means of tongues 6 clinched to said head plates, and thus any bar may be removed from any roller as desired. These head plates besides connecting the bars of each roller serve also as bearing plates for the bearing rods which pass removably through them.

The action of the invention will be well understood, the toothed edges of the bars serving to pinch the animal's foot when any roller is turned by its treading thereon and causing the animal to back off of the guard. The rollers are of such size and are so placed in relation to each other that the animal's foot cannot fall down between them and be permanently caught.

I claim—

1. A cattle guard comprising the frame; the rollers having a series of bars held with a space between their inner edges, and the removable bearing rod, passing through the sides of the frame and through the open space of the rollers, substantially as described.

2. In combination, in a cattle guard the frame, the rollers made up of a series of bars arranged with a space between their inner edges, the head plates connecting the bars and the bearing rods passing through the head plates and into the space between the bars, substantially as described.

LOUIS LEFLÉVE.

Witnesses:
 AUDRAL VANN,
 L. A. FEMANDEZ.